United States Patent [19]
Daugherty

[11] Patent Number: 5,699,982
[45] Date of Patent: Dec. 23, 1997

[54] SPACECRAFT WITH HEAT DISSIPATORS MOUNTED ON THERMALLY COUPLED SHELVES

[75] Inventor: Joseph Patrick Daugherty, Trenton, N.J.

[73] Assignee: Martin Marietta Corporation, East Windsor, Pa.

[21] Appl. No.: 506,163

[22] Filed: Jul. 24, 1995

[51] Int. Cl.$^6$ .................................................. B64G 1/50
[52] U.S. Cl. .................................................. 244/63; 165/41
[58] Field of Search ........................... 244/117 A, 158 R, 244/163; 165/13, 11.1, 41, 70, 104.14, 171

[56] References Cited

U.S. PATENT DOCUMENTS

| | | | |
|---|---|---|---|
| 4,738,304 | 4/1988 | Chalmers et al. | 165/13 |
| 5,351,746 | 10/1994 | Mackey et al. | 165/41 |

*Primary Examiner*—Galen L. Barefoot
*Attorney, Agent, or Firm*—W. H. Meise; C. A. Berard; S. A. Young

[57] ABSTRACT

A spacecraft includes heat-radiating panels. Heat-generating boxes such as TWTs are mounted on shelves which are inside the spacecraft, where they cannot radiate to space. The shelves are coupled by bent heat pipes to the exterior radiating panels.

8 Claims, 6 Drawing Sheets

SPACECRAFT WITH HEAT DISSIPATORS MOUNTED ON THERMALLY COUPLED SHELVES

FIELD OF THE INVENTION

This invention relates to spacecraft buses which carry heat-dissipating loads, and particularly to such buses in which the loads are carried on shelves which are coupled to the main panels by heat pipes.

BACKGROUND OF THE INVENTION

Communication spacecraft are widely used for carrying telephone, audio, video, and data services throughout the world. The weight, size, and reliability constraints imposed on spacecraft are by now well known, as is the problem of supplying enough propellant to provide attitude control and stationkeeping throughout its design lifetime. As the number of available geosynchronous orbital slots decreases, each successive spacecraft which occupies such an orbital slot is required to perform a larger number of services, as for example by carrying a larger number of channels, higher power in each channel, or both.

A major problem area in communication spacecraft lies in generation of radio-frequency (RF) power on the spacecraft, which is sufficient to provide the desired communications with Earth stations. Reliability considerations suggest that solid-state RF power devices should be used to generate the desired RF signals, but the DC-to-RF conversion efficiency of solid-state amplifiers has so far not approached that of travelling-wave tube (TWT) amplifiers. High efficiency is very important in a spacecraft, because all the needs of the spacecraft must be supplied ultimately from its solar panels. The use of TWT amplifiers appears to be a better tradeoff than solid-state amplifiers, because the reliability of a TWT amplifier over the design lifetime of a spacecraft is satisfactory, and its higher conversion efficiency allows smaller solar panels to be used, or alternatively, with larger solar panels, allows a greater number of TWT amplifiers, with a concurrent increase in the number of useful communication channels.

As mentioned, TWT amplifiers are more efficient in their DC-to-RF conversion than solid-state devices. Nevertheless, a system which includes a large number of high-power TWTs generates a large amount of waste or dissipated heat, which must be disposed of to prevent the TWTs, and other associated equipment, from overheating. In past and current systems, the waste heat is conductively coupled through the TWT mounting to the spacecraft structure, which conveys the heat away to radiator panels. The radiator panels are oriented with a broad surface facing a cool portion of space, and the temperature rise of the radiator panels results in radiation of thermal energy into space from that broad surface. Some such systems include heat pipes to provide a low-thermal-impedance path for spreading heat throughout the radiator panel, for thereby increasing the effective radiation area.

The dimensions of the heat radiating panels are selected to allow radiation of all the waste heat produced by the spacecraft, including the heat from the TWTs, without raising the temperature of the panels more than a particular amount. With the increased power-handling capability of newer spacecraft, consideration must be given to the use of deployable heat radiating panels. Such panels may radiate heat, but it is difficult and inconvenient to mount heat-dissipating hardware thereon. While the amount of radiator area has, in the past, been sufficient to accommodate mounting of all the heat-generating "boxes" of the spacecraft, not all the radiator area will be so available in the case of deployable heat radiator panels. As the number of such heat-dissipating boxes increases on future spacecraft, and the power dissipated by each box also increases due to increased performance demands, the "footprint" of the mounting/radiator panel which is available for mounting hardware may not be sufficient to accommodate all the boxes which must be heatsunk.

Improved mounting arrangements are desired.

SUMMARY OF THE INVENTION

A spacecraft comprises a first radiator panel, which in turn defines a first surface which radiates into space. The first radiator panel includes a first elongated heat pipe thermally coupled to the first surface. The first radiator panel also defines a second surface facing the interior of the spacecraft. At least a portion of the second surface is thermally coupled to the first heat pipe, whereby heat coupled to the first heat pipe from the second surface is transferred to the first surface and radiated into space. A heat-dissipating first load is coupled to the second surface, whereby its heat is coupled to the first heat pipe, and conveyed to the first surface of the first radiator panel, for radiation thereby. A shelf or bracket is mechanically mounted to the first radiator panel so that it extends parallel to, and at a predetermined distance from the second surface of the first radiator panel, at a location interior to the spacecraft, as a result of which a broad side of the shelf cannot radiate toward space. A bent second heat pipe has a first portion extending along the shelf, and is thermally coupled to the shelf. The second heat pipe also includes a second portion extending parallel, in close proximity, and thermally coupled to a portion of the first heat pipe. The second heat pipe also includes an elongated third portion extending between the first and second portions of the second heat pipe. A heat-dissipating second load is coupled to a surface of the shelf, in thermal communication (without an intermediary heat pipe) with the first portion of the second heat pipe, whereby the second heat pipe carries heat dissipated by the second load to the portion of the first heat pipe which is in contact with the second heat pipe. The first heat pipe carries the heat from the second heat pipe to the first surface of the radiator panel, from which it is radiated.

In a particular embodiment of the invention, the first radiator panel and the shelf both terminate at a plane which is orthogonal to the first radiator panel, as a result of which the first radiator panel and the shelf each define an edge extending along the plane, and the edges of the first radiator panel and of the shelf face into space. The second load includes a heat-radiating first travelling-wave tube which has a direct-radiation radiator for directly radiating some of its heat toward space, and also including a mounting surface through which additional heat flows. The first travelling-wave tube is mounted upon the shelf, with its mounting surface in thermal communication with the second heat pipe, and with its direct-radiation radiator extending beyond the edge of the shelf, and directed toward space. The first travelling-wave tube is desirably coupled to the surface of the shelf at a location overlying the at least a part of the first portion of the second heat pipe. The first load may also be a heat-radiating second travelling-wave tube which includes a direct-radiation radiator for directly radiating some of its heat toward space, and also including a mounting surface through which additional heat flows. This second travelling-wave tube may be mounted upon the radiator panel at a location lying between the shelf and the radiator panel, with the mounting surface of the second travelling-wave tube overlying the at least a part of the first heat pipe, and with the direct-radiation radiator of the second travelling-wave tube extending beyond the edge of the radiator panel, and directed toward space.

DESCRIPTION OF THE INVENTION

Figure 1A:
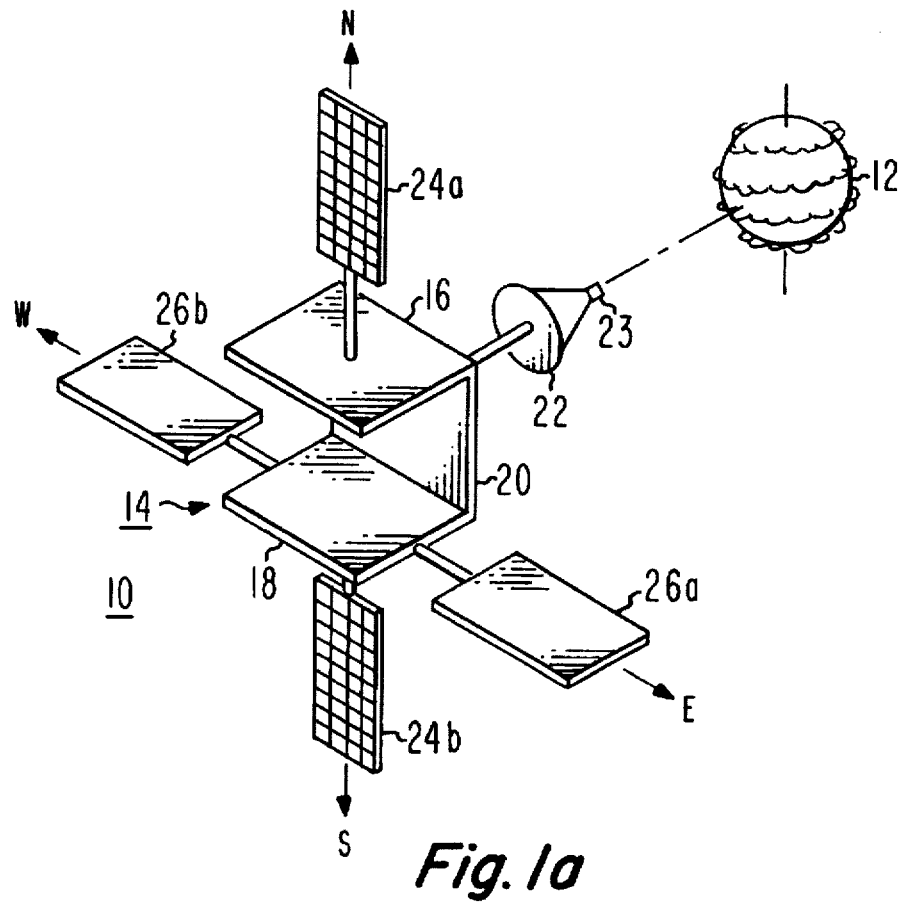
FIG. 1a is a simplified perspective or isometric view of a spacecraft including a heat-radiating panel, deployable heat radiators, and solar panels.

In the simplified perspective or isometric view of FIG. 1a, a spacecraft 10 orbits Earth 12 in a geostationary orbit. Spacecraft 10 includes joined-together body panels 16, 18, and 20, which may also be thermally joined, as described in U.S. Pat. No. 5,344,104, issued Sep. 6, 1994 in the name of Homer et al. Spacecraft 10 has a payload including an Earth-facing communications antenna illustrated as a reflector 22 with feed 23. Electrical power for operation of the various receivers, transmitters, attitude control and other functions of the spacecraft is supplied by a pair of solar panels 24a and 24b. Additional heat-radiating or heat-rejecting panels 26a and 26b are illustrated in their unfurled condition. These panels aid in rejecting the heat which is generated by active or heat-generating equipment (not illustrated in FIG. 1a) mounted upon panels 16, 18, and 20.

Figure 1B:
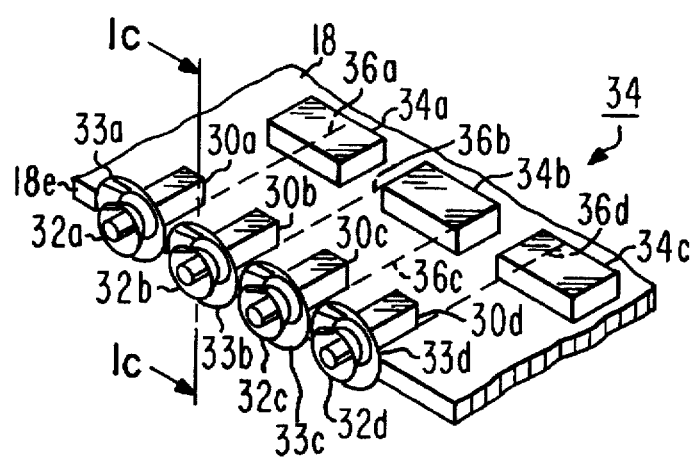
FIG. 1b is a simplified perspective or isometric view of a portion of a heat-radiating panel of the arrangement of FIG. 1, with some of the active devices mounted thereon.

FIG. 1b illustrates a detail of equipment-mounting and heat-rejecting panel 18 of FIG. 1a. In FIG. 1b, panel 18 mounts a line array including travelling-wave tubes (TWTs) 30a, 30b, 30c, and 30d. Each travelling-wave tube 38a–38d includes direct-radiation heat rejection devices. Travelling-wave tube 30a includes two direct-radiation heat rejection devices 32a, 33a. Travelling-wave tube 30b includes two direct-radiation heat rejection devices 32b, 33b. Similarly, travelling-wave tubes 30c and 30d each include two direct-radiation heat rejection devices 32c, 33c, and 32d, 33d, respectively. A number of other heat-dissipating devices mounted on panel 18 are illustrated as boxes 34a, 34b, and 34c. A plurality of elongated heat pipes (HP), illustrated by dash lines 36a, 36b, 36c, and 36d, extend through panel 18, orthogonal, or at right-angles to the edge 18e of panel 18, and under the corresponding one of the TWTs, for spreading heat from the TWTs and the nearby boxes 34 to other portions of heat radiation panel 18, and by way of other heat paths to deployed heat radiation panels 26a and 26b.

Figure 1C:
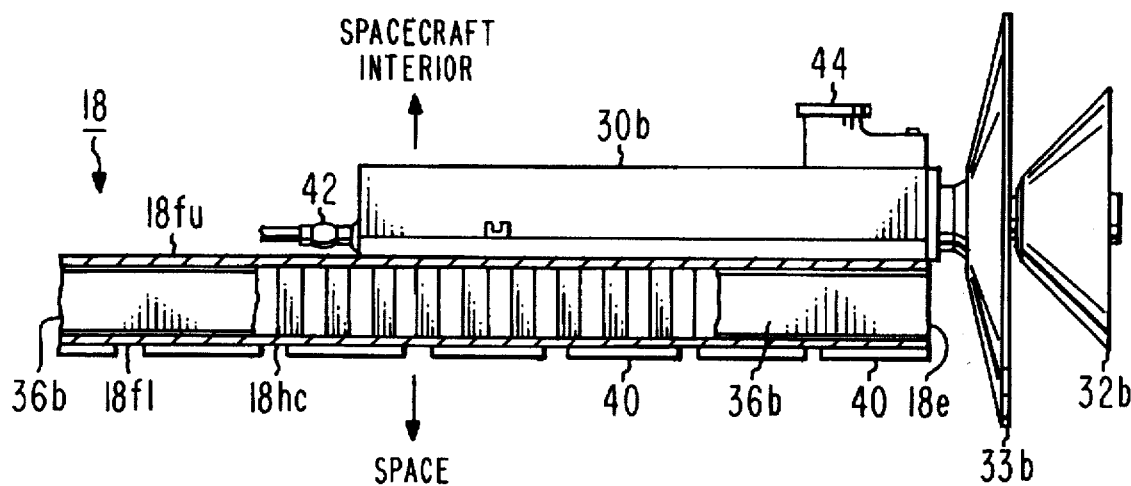
FIG. 1c is a cross-section of the arrangement of FIG. 1b.

FIG. 1c is a cross-section of the arrangement of FIG. 1b looking in the direction of section lines 1c–1c. In FIG. 1c, panel 18 is seen to include an upper face sheet 18fu and a lower face sheet 18fl, spaced apart by a honeycomb core structure 18hc. The face sheet and the honeycomb may be made from aluminum. The space-facing side of panel 18 has its surface covered by a plurality of optical solar reflectors 40, for reflecting insolation, and for allowing thermal radiation, as described, for example, in U.S. Pat. No. 5,400,986, issued Mar. 28, 1995 in the name of Amore et al. Heat pipe 36b extends through panel 18b, between the face sheets. The upper side of panel 18 faces into the interior of the spacecraft, and cannot radiate heat, because the interior of the spacecraft is at generally the same temperature as the panel.

A travelling-wave tube 30b is mounted by means of a screw 31 on the upper surface 18fu of panel 18 of FIG. 1c, with its direct-radiation heat rejecting radiators 32b and 32c extending over the end 18e of panel 18. Such tubes are commonly available from manufacturers such as AEG and Thomson, although the configurations of the heat-rejecting radiators vary among manufacturers. The mounting of travelling-wave tube 30b to upper surface 18fu is made thermally conductive by means of a silver-loaded elastomer. Travelling-wave tube 30b includes a coaxial input port 42, and a waveguide output port 44 at which the amplified signal appears. During operation, each TWT 30a–30d, and the other TWTs (not illustrated) used in the system, generate waste heat, some of which is directly radiated to space by structures 32 and 33, and some of which is conductively coupled to that portion of heat pipe 36b underlying the TWT. Manufacturer's specification sheets indicate that for a TWT which dissipates or generates a total of about 73 watts, about 44 watts is radiated directly to space, and the remainder is coupled to the mounting. It should be noted that the major portion of the remaining heat is generated in the vicinity of the collector of the TWT, which is near the end adjacent the output port 44. Thus, the principal conductive heat load which a direct-radiation TWT produces lies near the free edge of the panel upon which it is mounted.

In accordance with an aspect of the invention, the number of heat-generating sources, such as boxes 34 or travelling-wave tubes 30, which are available on spacecraft 10, exceeds the number to be carried in the illustrated fashion on panel 18. According to an aspect of the invention, brackets or shelves are associated with panel 18, and lie within the spacecraft 10, which provide additional surface area on which heat-generating equipment may be mounted. Analysis has shown that the thermal conduction of simple thermally conductive shelf supports is insufficient to maintain the desired temperatures on the shelf. According to another aspect of the invention, the shelves are thermally coupled by heat pipes to their main panel, such as panel 18.

Figure 2B:
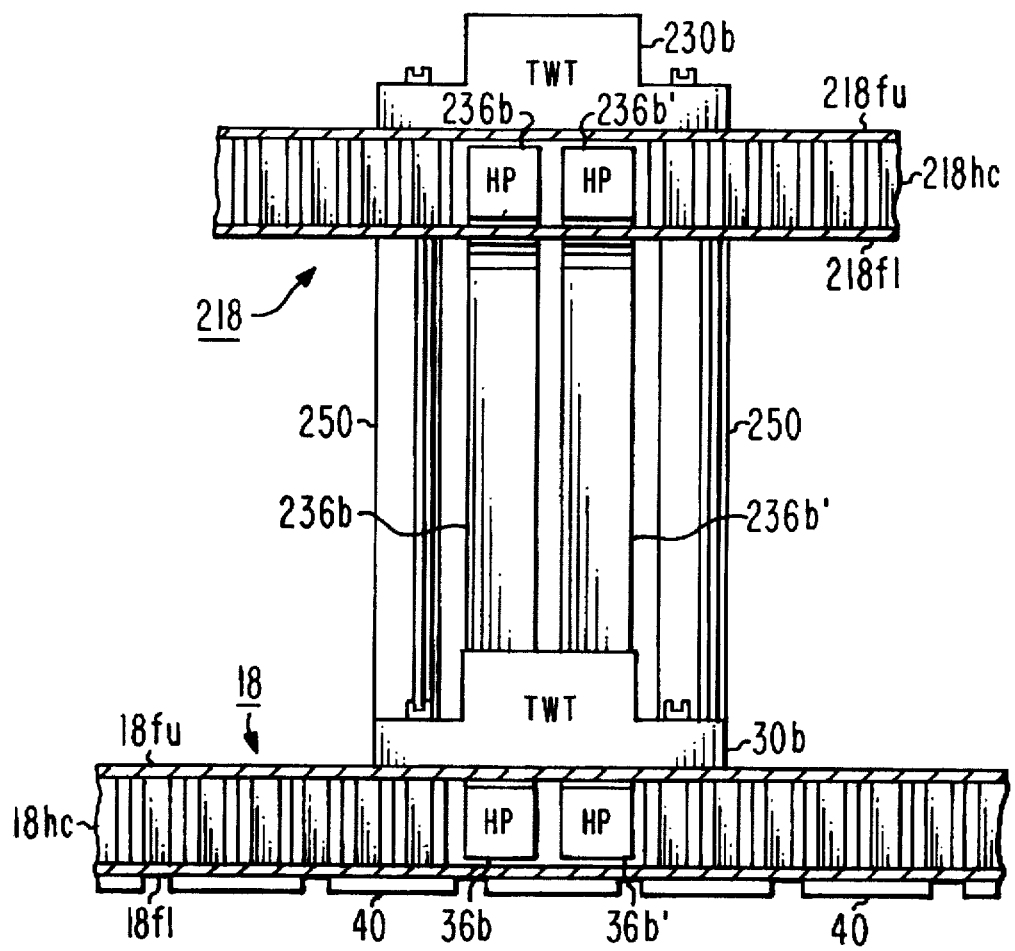
FIG. 2b is a cross-section thereof.
Figure 2A:
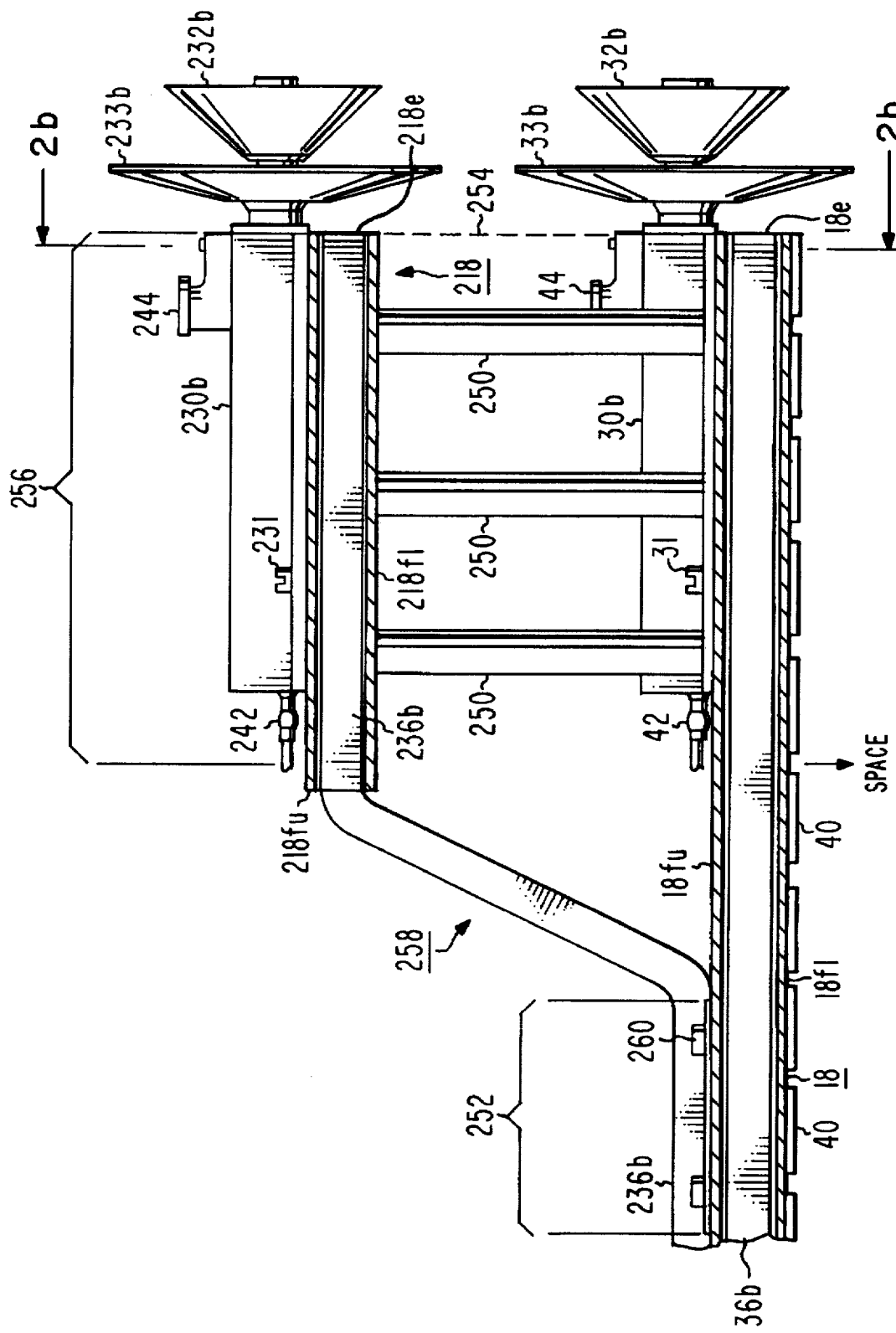
FIG. 2a is a simplified side view of an arrangement according to an aspect of the invention.

FIG. 2a is a simplified side view of an arrangement according to an aspect of the invention, and FIG. 2b is a cross-section thereof looking in the direction of section lines 2b–2b. In FIG. 2a, elements corresponding to those of FIGS. 1a, 1b, and 1c are designated by like reference numerals. As can be seen in FIG. 2b, redundant heat pipes are embedded in panel 18; a second heat pipe 36b extends parallel to heat pipe 36b, and both heat pipes lie under TWT 30b. FIGS. 2a and 2b illustrate a further equipment mounting shelf 218 which lies parallel to panel 18, and which is held spaced away from panel 18 by a plurality of columns or mounting elements designated 250. Shelf 218 is made from the same lightweight material as panel 18, and also includes an upper faceplate 218fu and a lower faceplate 218fl. The end 218e of shelf 218 lies in the same plane 254 as the end 18e of panel 18. Shelf 218 includes portions 256 of a pair of heat pipes 236b and 36b'. A further portion 252 of heat pipes 236b and 236b' extends along, and parallel to, a portion of the upper faceplate 18fu of panel 18, directly above corresponding portions of heat pipes 36b and 36b', so as to be as close as possible thereto, to provide good thermal coupling between heat pipes 236b and 236b' and heat pipes 36b and 36b'. A middle portion 258 of heat pipes 236b and 236b' extends between, and thermally connects, portions 252 and 256 of heat pipes 236b and 236b'. Coaxial input ports 42 and 242 of TWTs 30b and 230b, respectively, are coupled to sources (not illustrated) for receiving signals to be amplified. The amplified signals are applied to waveguide output ports 44 and 244, respectively, for being coupled to a utilization apparatus, which may be an antenna.

In operation of the arrangement of FIGS. 2a and 2b, a portion of the heat generated within the TWTs is directly radiated by means of structures 32b, 33b, and 232b, 233b. The remaining heat is coupled to the heat pipes extending below the TWT, from TWT 30b to heat pipes 36b and 36b', and from TWT 230b to portion 256 of heat pipes 236b and 236b'. Heat pipes 36b and 36b' carry the heat from TWT 30b laterally along panel 18, and the heat is ultimately rejected to space by radiation from the lower, space-facing surface of panel 18, or by another panel (not illustrated) in FIGS. 2a and 2b. Heat from TWT 230b which is not directly radiated is coupled to portion 256 of heat pipes 236b and 236b', and coupled laterally through heat pipe connecting portion 258 to portion 252 of heat pipes 236b and 236b'. Heat is readily transferred from heat pipes 236b and 236b' to heat pipes 36b and 36b', respectively, by way of the close spacing therebetween. In order to make spacecraft assembly and disassembly for test easier, the mounting shelf 218 is removable from panel 18. Since heat pipes 236b and 236b' extend through shelf 218, they cannot conveniently be removed therefrom. However, disassembly of shelf 218 from panel 18 can readily be accomplished if the thermal connection between heat pipes 236b and 236b' and heat pipes 36b and 36b' in region 252 is demountable, which is the case if the thermal contact is maintained by a thermal grease or conductor-filled RTV elastomer. Thus, removal of shelf 218 is accomplished by unfastening the shelf from supports 250, and by breaking the thermal connection in region 252. It can be reinstalled by placing an appropriate amount of the grease or RTV at the thermal interface, and fastening the shelf 218 to supports 250. If desired, clamps, illustrated as 260 in FIG. 2a, may be used to maintain pressure between the thermal surfaces and to prevent voids. The clamps allow ready demounting of the shelf and heat pipe.

Figure 3A:
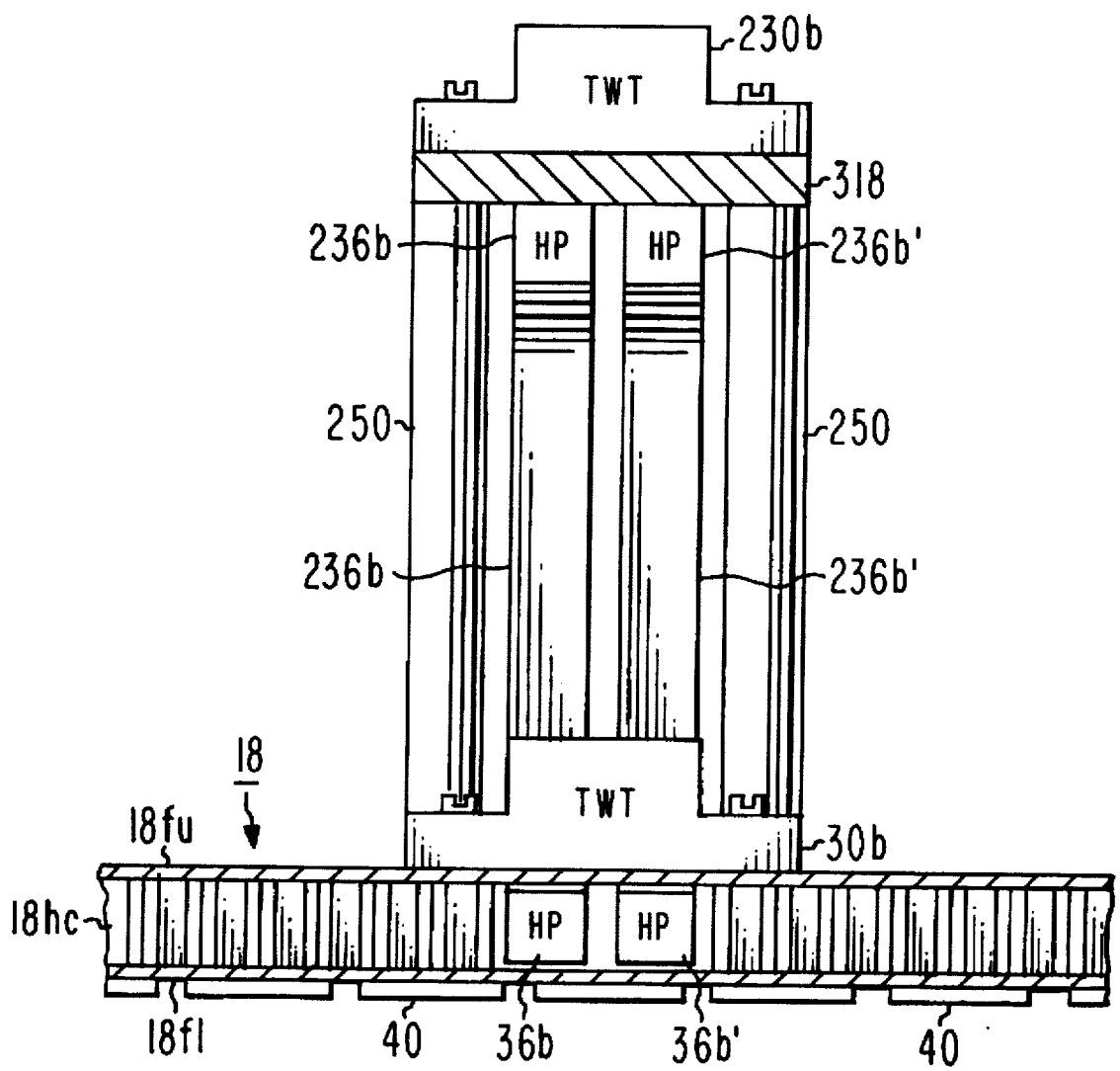
FIGS. 3a and 3b are cross-sectional views of other embodiments of the invention.

FIG. 3a is a simplified view similar to the cross-section of FIG. 2b, of a slightly different embodiment of the invention, in which TWT 230b is mounted on a bracket 318 rather than a shelf. For this purpose, a bracket consists of a single support layer, such as a single layer of aluminum. In this regard, a "bracket" is conceptually equivalent to the upper facesheet of a honeycomb shelf such as that of FIGS. 2a and 2b. However, the "bracket", since it lacks the mechanical support of the lower facesheet and honeycomb core, must be somewhat thicker than a facesheet in order to provide sufficient rigidity. However, the term "shelf" will be understood to include brackets hereinbelow. In FIG. 3a, shelf 318 is a thermally conductive flat plate supported by members 250. Bent heat pipes 236b and 236b' extend along the lower surface of the shelf 318, and in thermal contact therewith, either brazed or welded thereto, or held by fasteners. Thermally conductive filler grease or elastomer may be used at the interface. The interface between TWT 230b and shelf 318 may be similarly filled.

Figure 3B:
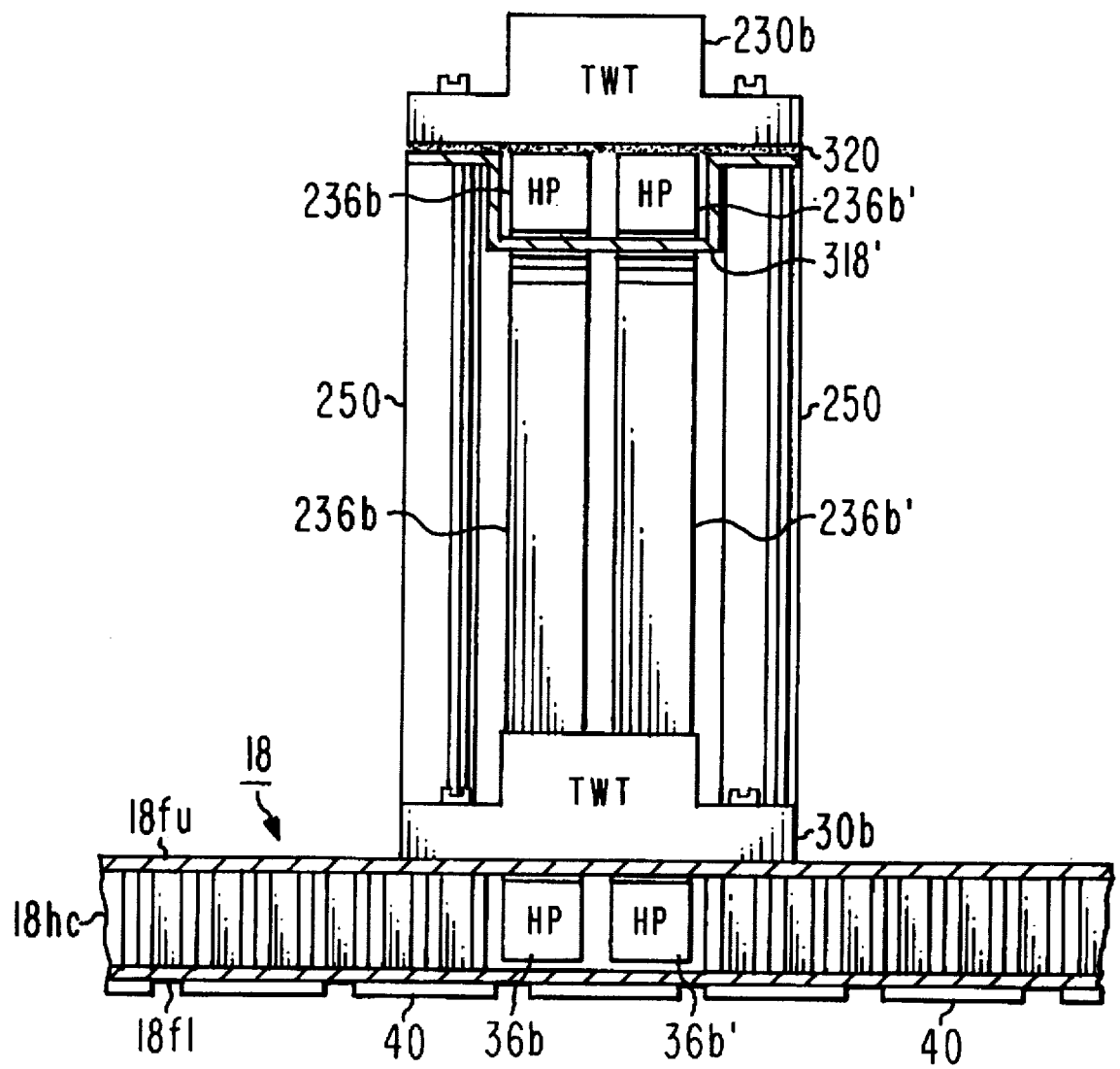

The arrangement of FIG. 3b is similar to that of FIG. 3a, but the shelf 318' is thinner, and bent into a "U" shape for increased structural rigidity. This reduces the weight of the shelf, and allows the heat pipes 236b and 236b' to extend along its upper surface, rather than its lower surface. This arrangement, in turn, has the advantage that TWT 230b can be mounted directly against the upper side of heat pipes 236b and 236b', thereby eliminating one thermal interface through which heat must flow. The filler thermal grease or conductive elastomer is illustrated as a layer 320.

Figure 4:
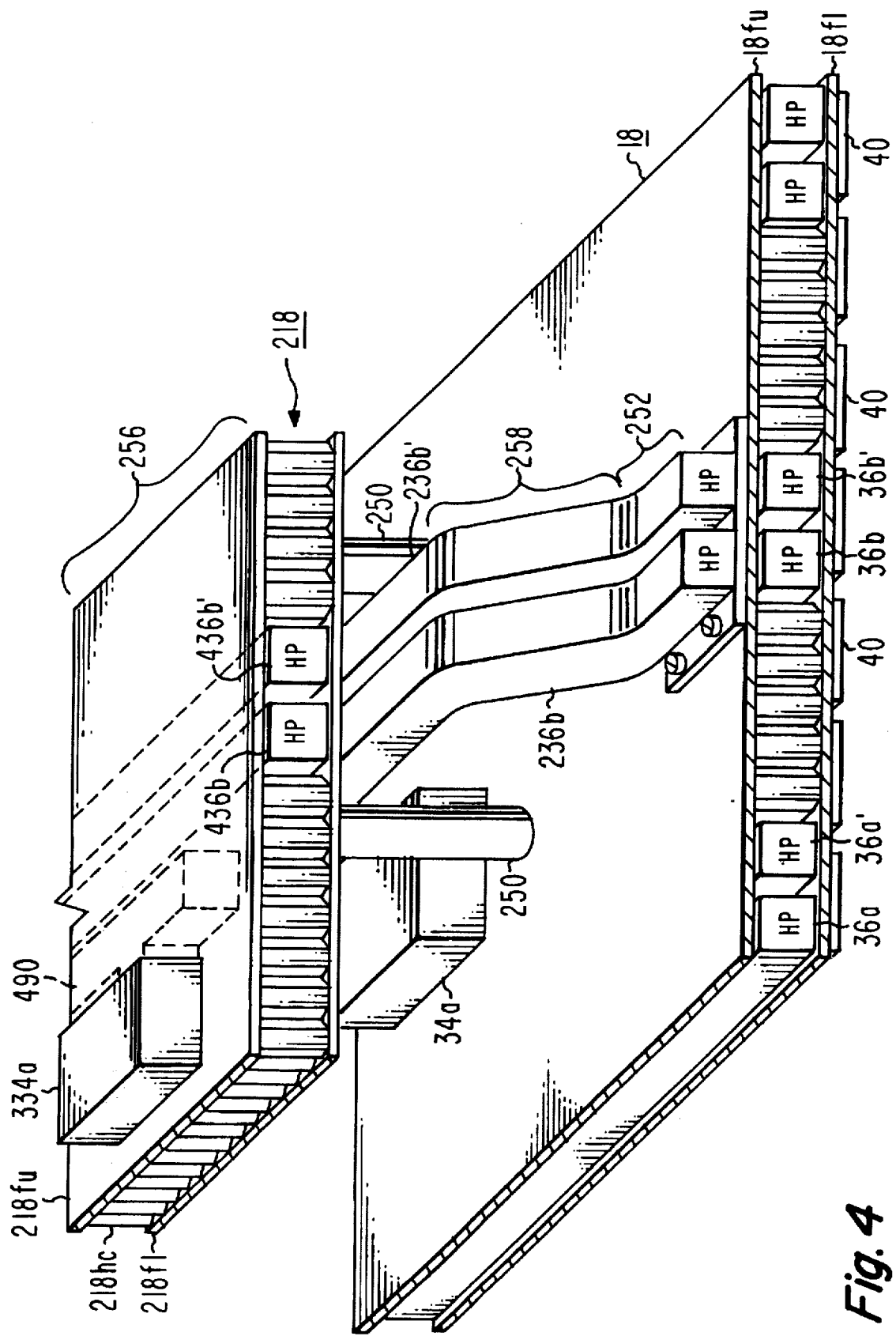
FIG. 4 is a simplified perspective or isometric view of a portion of a radiating panel and thermally coupled mounting shelf of according to another aspect of the invention.

FIG. 4 illustrates another arrangement according to the invention, in which interior shelf 218 includes upper and lower face plates, and also includes a lightweight core, in this case a honeycomb core. In the arrangement of FIG. 4, heat pipes 236b and 236b' extend under shelf 218, rather than through the shelf as in FIGS. 2a and 2b. If a heat-dissipating box were to be mounted on upper facesheet 218fu at a location overlying heat pipes 236b and 236b', the waste heat produced in the box would have to travel through the core 218hc of the shelf in order to reach heat pipes 236b and 236b'. The low conductivity of the core would make this an unsatisfactory mounting. As illustrated in FIG. 4, shelf 218 has further heat-spreading heat pipes 436b and 436b' extending therethrough, in contact with the upper and lower faceplates 218fu and 218fl, respectively. Any heat-producing box mounted over heat-spreading heat pipes 436b and 436b' will be conveyed to bent heat pipes 236b and 236b', respectively, which in turn will couple the heat to heat pipes 36b and 36b', respectively, which spread the heat throughout radiator panel 18, for radiation by optical solar reflectors 40 over the lower surface 18 of the panel. A heat-producing box such as box 334a, mounted at a location, which does not overlie a heat pipe 436b or 436b', can be thermally coupled thereto by a further heat pipe, illustrated as 490.

Thus, a spacecraft (10) according to the invention comprises a first radiator panel (18), which in turn defines a first surface (18fl, 40) which radiates into space. The first radiator panel (18) includes a first elongated heat pipe (36b) thermally coupled to the first surface (18fl, 40). The first radiator panel (18) also defines a second surface (18fu) facing the interior of the spacecraft. At least a portion of the second surface (18fu) is thermally coupled to the first heat pipe (36b), whereby heat coupled to the first heat pipe (36b) from the second surface (18fu) is transferred to the first surface (18fl, 40) and radiated into space. A heat-dissipating first load (30b, 34b) is coupled to the second surface (18fu), whereby its heat is coupled to the first heat pipe (36b), and conveyed to the first surface (18fl, 40) of the first radiator panel (18), for radiation thereby. A shelf (218) is mechanically mounted by supports (250) to the first radiator panel (18) so that the shelf (218) extends parallel to, and at a predetermined distance from the second surface (18fu) of the first radiator panel (18), at a location interior to the spacecraft, as a result of which a broad side (218fu, 218fl) of the shelf (218) cannot radiate toward space. A bent second heat pipe (236b) has a first portion (256) extending along the shelf (218), and is thermally coupled to the shelf. The second heat pipe (236b) also includes a second portion (252) extending parallel, in close proximity, and thermally coupled to a portion of the first heat pipe (36b). The second heat pipe (236b) also includes an elongated third portion (258) extending between the first (256) and second (252) portions of the second heat pipe (236b). A heat-dissipating second load (230b, 334a) is coupled to a surface of the shelf (218), in thermal communication with the first portion (256) of the second heat pipe (236b), whereby the second heat pipe (236b) carries heat dissipated by the second load (230b, 334a) to the portion (252) of the first heat pipe (36b) which is in thermal contact with the second heat pipe (236b). The first heat pipe (36b) carries the heat from the second heat pipe (236b) to the first surface (18fl, 40) of the radiator panel (18), from which it is radiated. In one embodiment of the invention, the heat-dissipating second load is in thermal communication with the first portion (256) of the second heat pipe (236b) without an intermediary heat pipe.

In a particular embodiment of the invention, the first radiator panel (18) and the shelf (218) both terminate at a plane (254) which is orthogonal to the first radiator panel (18), as a result of which the first radiator panel (18) and the shelf (218) each define an edge (18e, 218e) extending along the plane (254), and the edges (18e, 218e) of the first radiator panel (18) and of the shelf (218) face into space. The second load (230b, 334a) includes a heat-radiating first travelling-wave tube (230b) which has a direct-radiation radiator (232b, 233b) for directly radiating some of its heat toward space, and also including a mounting surface (facing 218fu) through which additional heat flows. The first travelling-wave tube (230b) is mounted upon the shelf (218), with its mounting surface in thermal communication with the second heat pipe (236b), and with its direct-radiation radiator (232b, 233b) extending beyond the edge 218e) of the shelf, and directed toward space. The first travelling-wave tube is desirably coupled to the surface of the shelf at a location overlying at least a part of the first portion (256) of the second heat pipe (236b). The first load (30b, 34b) may also be a direct heat radiating second travelling-wave tube (30b) which includes a direct-radiation radiator (32b, 33b) for directly radiating some of its heat toward space, and also including a mounting surface (facing 18fu) through which additional heat flows. This second travelling-wave tube (30b) may be mounted upon the radiator panel (18) at a location lying between the shelf (218) and the radiator panel (18), with the mounting surface of the second travelling-wave tube (30b) overlying at least a part of the first heat pipe (36b), and with the direct-radiation radiator (32b, 33b) of the second travelling-wave tube (30b) extending beyond the edge (18e) of the radiator panel (18), and directed toward space.

Other embodiments of the invention will be apparent to those skilled in the art. For example, the face sheets and the core structure of panel 18, and other equivalent panels, may be made from fiber-reinforced epoxy, or other equivalent lightweight material, or the core may be a foamed material. Instead of silver-loaded thermal transfer mediums, the thermal interfaces may be improved with silicone thermal grease. While a single shelf has been illustrated, a plurality of shelves may be stacked, one over the other, to achieve the desired amount of equipment-mounting "footprint" area; these shelves may be coupled by heat pipe(s) to the next lower shelf of the system, or each shelf may be coupled by heat pipe(s) directly to the main radiating panel.

What is claimed is:

1. A spacecraft, comprising;
   a first radiator panel which defines a first surface which radiates into space, and which includes at least a first elongated heat pipe thermally coupled to said first surface, said first radiator panel also defining a second surface, at least a portion of which is thermally coupled to said first heat pipe, whereby heat coupled to said first heat pipe from said second surface is transferred to said first surface and radiated into space;
   a heat-dissipating first load coupled to said second surface, whereby its heat is coupled to said first heat pipe, and conveyed to said first surface of said first radiator panel, for radiation thereby;
   a shelf;
   shelf mounting means mechanically coupled to said shelf and to said first radiator panel, for mounting said shelf so that it extends parallel to said first radiator panel at a predetermined distance from said second surface thereof, at a location interior to said spacecraft, whereby a broad side of said shelf cannot radiate toward space;
   a bent second heat pipe, including a first portion extending along, and thermally coupled to, said shelf, said heat pipe also including a second portion extending parallel to, in close proximity, and thermally coupled to, a portion of said first heat pipe, said second heat pipe also including an elongated third portion extending between said first and second portions of said second heat pipe;
   a heat-dissipating second load coupled to a surface of said shelf, in thermal communication with said first portion of said second heat pipe, whereby said second heat pipe carries heat dissipated by said second load to said portion of said first heat pipe, which in turn carries said heat from said second heat pipe to said first surface of said radiator panel.

2. A spacecraft according to claim 1, wherein:
   said first radiator panel and said shelf both terminate at a plane which is orthogonal to said first radiator panel, whereby said first radiator panel and said shelf each define an edge extending along said plane, and said edges of said first radiator panel and of said shelf face into space; and
   said second load comprises a heat-radiating first travelling-wave tube which includes a direct-radiation radiator for directly radiating some of its heat toward space, and which also includes a mounting surface through which additional heat flows, said first travelling-wave tube being mounted upon said shelf, with said mounting surface in thermal communication with said second heat pipe, and with said direct-radiation radiator of said first travelling-wave tube extending beyond said edge of said shelf, and directed toward space.

3. A spacecraft according to claim 2, wherein said heat-dissipating second load is coupled to a surface of said shelf at a location overlying said part of said first portion of said second heat pipe.

4. A spacecraft according to claim 2, wherein:
   said first load comprises a heat-radiating second travelling-wave tube which includes a direct-radiation radiator for directly radiating some of its heat toward space, and which also includes a mounting surface through which additional heat flows, said second travelling-wave tube being mounted upon said radiator panel at a location lying between said shelf and said radiator panel, with said mounting surface of said second travelling-wave tube overlying said at least a part of said first heat pipe, and with said direct-radiation radiator of said second travelling-wave tube extending beyond said edge of said radiator panel, and directed toward space.

5. A spacecraft according to claim 1, wherein said heat-dissipating second load is in thermal communication with said first portion of said second heat pipe, without an intermediary heat pipe.

6. A spacecraft according to claim 1, wherein said shelf is in the form of a single layer of thermally conductive material.

7. A spacecraft according to claim 6, wherein said single layer is bent to form a structurally rigid member.

8. A spacecraft according to claim 1, wherein said shelf includes a facesheet and a lightweight reinforcing layer, and said first portion of said bent second heat pipe is thermally coupled to said faceplate.

* * * * *